(12) United States Patent
Bhanage (10) Patent No.: US 9,456,433 B2
(45) Date of Patent: Sep. 27, 2016

(54) METHOD AND SYSTEM FOR CLIENT DEVICE LOCALIZATION

(71) Applicant: Aruba Networks Inc., Sunnyvale, CA (US)

(72) Inventor: Gautam Bhanage, Sunnyvale, CA (US)

(73) Assignee: Aruba Networks, Inc., Sunnyvale, CA (US)

( * ) Notice: Subject to any disclaimer, the term of this patent is extended or adjusted under 35 U.S.C. 154(b) by 29 days.

(21) Appl. No.: 14/262,663

(22) Filed: Apr. 25, 2014

(65) Prior Publication Data

US 2015/0312875 A1 Oct. 29, 2015

(51) Int. Cl.
*H04W 64/00* (2009.01)
*H04B 17/20* (2015.01)

(52) U.S. Cl.
CPC ............. *H04W 64/00* (2013.01); *H04B 17/20* (2015.01); *H04W 64/003* (2013.01)

(58) Field of Classification Search
CPC .............................. H04W 64/00; H04B 17/20
See application file for complete search history.

(56) References Cited

U.S. PATENT DOCUMENTS

| | | | |
|---|---|---|---|
| 2006/0262731 A1* | 11/2006 | Carlson et al. | 370/252 |
| 2007/0247367 A1* | 10/2007 | Anjum et al. | 342/464 |
| 2009/0232010 A1* | 9/2009 | Li et al. | 370/248 |
| 2012/0081249 A1* | 4/2012 | Kaiser et al. | 342/174 |
| 2012/0294231 A1* | 11/2012 | Finlow-Bates et al. | 370/328 |
| 2012/0327914 A1* | 12/2012 | Kang et al. | 370/336 |

* cited by examiner

*Primary Examiner* — Kashif Siddiqui
*Assistant Examiner* — Minjung Kim
(74) *Attorney, Agent, or Firm* — Brooks, Cameron & Huebsch, PLLC (57) ABSTRACT

A system includes one or more hardware processors causing performance of operations. The operations include transmitting, by a first access point, a set of one or more wireless signals that include a request for feedback information. The set of wireless signals incorrectly identifies a second access point as the sender of the set of wireless signals instead of correctly identifying the first access point as the sender of the set of wireless signals. The operations further include receiving, from a client device associated with the second access point, a feedback information corresponding to the receipt of the set of wireless signals by the client device, and, based on the feedback information: determining a distance between the first access point and the client device that is associated with the second access point.

18 Claims, 8 Drawing Sheets

METHOD AND SYSTEM FOR CLIENT DEVICE LOCALIZATION

BACKGROUND

Computer networks allow users to connect to other users and to various sources of content. For example, using a user's computing device, the user may receive information from a remote location. The information is sent by way of packets. In order to send and receive packets wirelessly, a computing device establishes a connection with an access point (AP) and directly transmits the packet to the AP or receives the packet from the AP. In other words, for transmission, the wireless transmission of the packet from the computing device is directly to the access point without another wireless intermediate destination. In some cases, it is useful to know the location of the client device.

OVERVIEW

In general, in one aspect, embodiments relate to a system that includes one or more hardware processors causing performance of operations. The operations include transmitting, by a first access point, a set of one or more wireless signals that include a request for feedback information. The set of wireless signals incorrectly identifies a second access point as the sender of the set of wireless signals instead of correctly identifying the first access point as the sender of the set of wireless signals. The operations further include receiving, from a client device associated with the second access point, a feedback information corresponding to the receipt of the set of wireless signals by the client device, and, based on the feedback information: determining a distance between the first access point and the client device that is associated with the second access point.

In general, in one aspect embodiments relate to a non-transitory computer readable medium that include instructions which, when executed by one or more hardware processors, causes performance of operations. The operations include transmitting, by a network device, a set of one or more wireless signals addressed to a client device and including a request for feedback information, receiving, from the client device, the feedback information corresponding to a receipt of the set of wireless signals, and, based on the feedback information, identifying a particular wireless signal of the set of wireless signals received on an indirect radio frequency path. The operations further include computing a first path loss value by subtracting a received signal strength of the particular wireless signal from a transmit power used for transmitting the particular wireless signal, and responsive to the particular wireless signal being received on an indirect radio frequency path, computing a second path loss value that is lower than the first path loss value estimating a distance between the network device and the client device. The operations further include estimating a distance between the network device and the client device based on the second path loss value.

In general, in one aspect, embodiments relate to a non-transitory computer readable medium comprising instructions which, when executed by one or more hardware processors, causes performance of operations that include transmitting, by a network device, a set of one or more wireless signals addressed to a client device and including a request for feedback information, receiving, from the client device, the feedback information corresponding to a receipt of the set of wireless signals, and, based on the feedback information, identifying a particular wireless signal of the set of wireless signals received on an indirect radio frequency path. The system further includes responsive to the particular wireless signal being received on an indirect radio frequency path, computing a particular signal strength, that is higher than a received signal strength of the particular wireless signal, computing a path loss value by subtracting the particular signal strength from the transmit power used for transmitting the particular wireless signal, and estimating a distance between the network device and the client device based on the path loss value.

Other aspects will be apparent from the following description and the appended claims.

BRIEF DESCRIPTION OF DRAWINGS

FIGS. 4, 5, 6.1, 6.2, and 7 show examples in accordance with one or more embodiments.

DETAILED DESCRIPTION

Specific embodiments will now be described in detail with reference to the accompanying figures. Like elements in the various figures are denoted by like reference numerals for consistency.

In the following detailed description of embodiments, numerous specific details are set forth in order to provide a more thorough understanding. However, it will be apparent to one of ordinary skill in the art that the embodiments may be practiced without these specific details. In other instances, well-known features have not been described in detail to avoid unnecessarily complicating the description.

In general, embodiments are directed to client device localization. Specifically, a client device is associated with an access point. Another affiliated access point sends at least one wireless signal that includes a request for signal feedback information to the client device. The wireless signal incorrectly identifies or spoofs the associated access point as the sender of the request for signal feedback information. By incorrectly identifying the associated access point, the client device does not ignore the request, but rather generates the feedback information and responds to the associated access point. The client generates the feedback information using the wireless signal from the affiliated access point and transmits the feedback information to the associated access point based on the false identification. One or more embodiments determine a distance from a client device to one or more access points using the feedback information. Based on the distances to multiple access points, one or more embodiments may determine the location of the client device.

Figure 1:
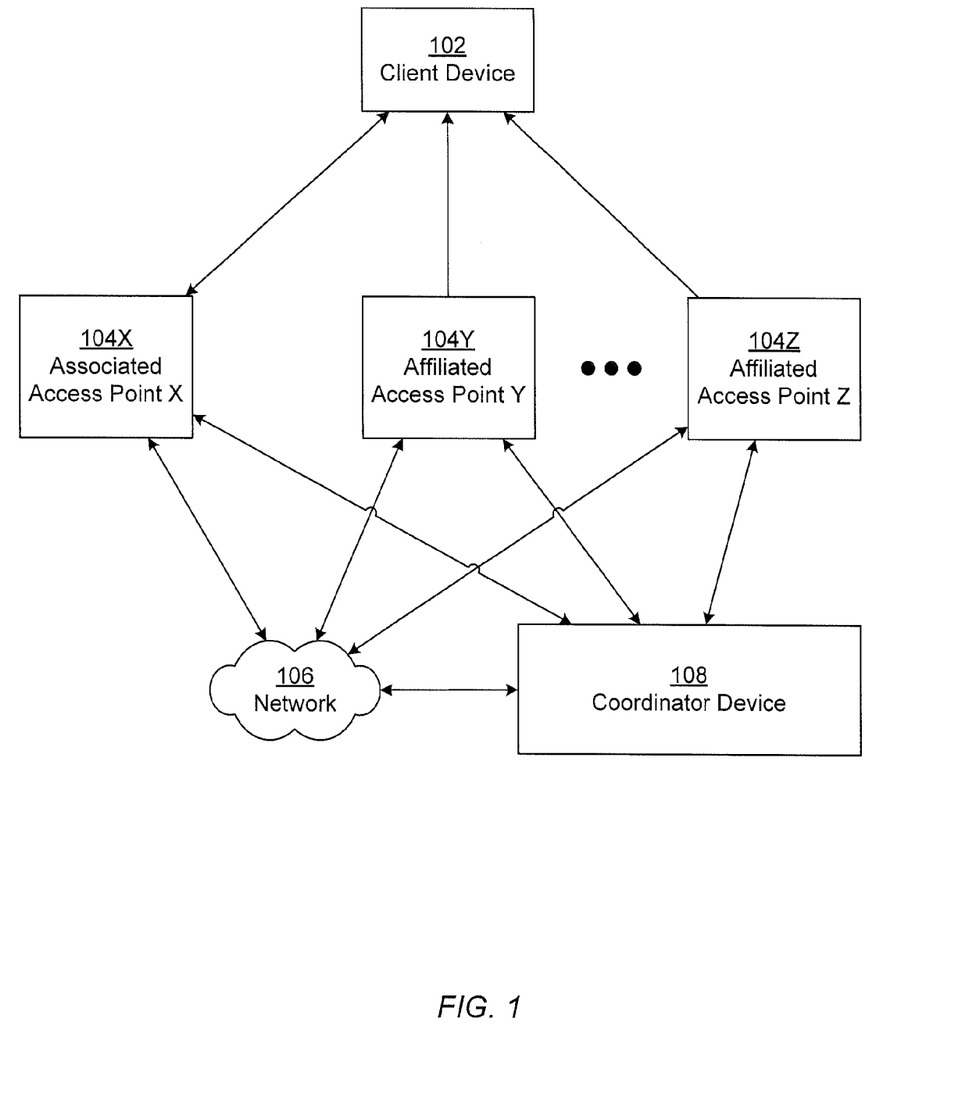
FIGS. 1 and 2 show schematic diagrams in accordance with one or more embodiments.

FIG. 1 shows a schematic diagram in accordance with one or more embodiments. As shown in FIG. 1, the system includes a client device (102), access points (e.g., associated access point X (104X), associated access point Y (104Y), associated access point Z (104Z)), and a coordinator device (108). Each of these components is described below.

A client device (102) is any type of computing system or device in accordance with one or more embodiments. For example, a client device (102) may be the computing system shown in FIG. 8. In one or more embodiments, the client device (102) is the device for which localization is performed. Localization, as used herein, may refer to one or more distances, distance(s) and direction, a particular location, such as in three dimensional space, or another geographic measurement. A location refers to the geographic position of the client device. The location may be approximate or accurate, relative or absolute, and may use any coordinate system. For example, the location may be the approximate position of the network interface connection (not shown) of the client device (102) with respect to one or more access points. Alternatively, the location may be an absolute position of the client device, such as a building identifier and room identifier, longitude and latitude of the client device, or other unique absolute position of the client device.

The client device (102) may be connected to a network (106) via a network interface connection (not shown) and an access point (e.g., associated access point X (104X), associated access point Y (104Y), associated access point Z (104Z)). The network (106) may be a local area network (LAN), a wide area network (WAN) such as the Internet, mobile network, or any other type of network, or a combination of networks.

An access point (e.g., associated access point X (104X), associated access point Y (104Y), associated access point Z (104Z)) is a digital hardware device that may be communicatively coupled to the network (106). The access point (e.g., associated access point X (104X), associated access point Y (104Y), associated access point Z (104Z)) is a separate hardware unit from client device (102), that is capable of being directly, wired or wirelessly, connected to the client device (102) and is capable of being in a communication path from the client device to the network (106). In other words, the access point may be directly connected via the direct wired/wireless connection to a network interface card on the client device (102). Further, access points may be directly connected to the network (106) or connected via a controller. By way of an example, the access point may include a wireless access point (WAP) that communicates wirelessly with client devices using Wi-Fi, Bluetooth or related standards and that communicates with a wired network.

Each access point may be connected to any number of client devices at any moment in time. Specifically, each access point may be connected to no client devices, a single client device, or multiple client devices at any particular moment in time. Further, the number of client devices connected to an access point may be heterogeneous amongst access points.

An access point is an associated access point (e.g., associated access point X (104X)) when the access point is directly, wired or wirelessly, connected to the client device (102) and is in a communication path from the client device (102) to the network (106). In other words, a client device (102) associates with an access point (e.g., associated access point X (104X)) to connect to the network (106). An access point is an affiliated access point (e.g., affiliated access point Y (104Y), affiliated access point Z (104Z)) when the access point is not associated with the client device (102), but may be affiliated with the associated access point (e.g., associated access point X (104X)) and may transmit requests to the client device (102), which are processed or ignored. For example, affiliated access points may be access points that are nearby or within a threshold distance to the client device (102) and are within the same local network as the associated access point (e.g., associated access point X (104X)).

In one or more embodiments, the client device (102) is configured to send and receive packets from the associated access point (e.g., associated access point X (104X)) in order to communicate with other devices on the network (106). The client device (102) further is configured to ignore packets from other access points (e.g., affiliated access point Y (104Y), affiliated access point Z (104Z)). The associated access point (e.g., associated access point X (104X)) is configured to send and receive packets with the client device (102) based on the association with the client device. The affiliated access points (e.g., affiliated access point Y (104Y), affiliated access point Z (104Z)) are configured to send one or more wireless signals to the client device that incorrectly identifies the associated access point (e.g., associated access point X (104X)) as the sender of the one or more wireless signals. In other words, the affiliated access points (e.g., affiliated access point Y (104Y), affiliated access point Z (104Z)) are configured to spoof the associated access point (e.g., associated access point X (104X)).

By way of an example, consider the scenario in which a warehouse has multiple wireless access points. Although four wireless access points (e.g., access point Q, access point R, access point S, and access point T) are close enough for communicating in the warehouse, a tablet computing device associates with wireless access point Q because wireless access point Q is the closest access point that appears to have the strongest signal. The tablet computing device may alternatively have associated with access point Q, access point R, access point S, and access point T. Because the tablet computing device is associated with wireless access point Q, the tablet computing device sends and receives packets on the network using wireless access point Q. Further, the tablet computing device ignores requests for feedback information from other access points that identify other access points. In order to have the request for feedback information processed by the client device (102), the other access points (e.g., access point R, access point S, and access point T) are configured to spoof access point Q.

Continuing with FIG. 1, the access points (e.g., access point X (102X), access point Y (102Y)) may be operatively connected, directly or via the network (106), to a coordinator device (108). The coordinator device (108) may correspond to a computing system or execute on a computing system and cause the computing system to coordinate locating the client device (102). Coordinate locating the client device may include identifying the client device for localization, identifying the associated access point that is associated with the client device, and selecting affiliated access points. Coordinating may further include transmitting requests to the various access points to request feedback information from the client device. For example, the coordinator device (108) may correspond to one of the access points, the set of access points, or a separate computing device. The coordinator device (108) may correspond to the computing device shown in FIG. 8 and described below.

In one or more embodiments, the access points (e.g., access point X (102X), access point Y (102Y)), coordinator device (108) may be operatively connected, directly or via the network (106), to a network device (not shown). For example, the network device may correspond to one of the access points, the set of access points, the coordinator device, a separate computing device, or a combination of devices. The network device may correspond to the computing device shown in FIG. 8 and described below.

Figure 2:
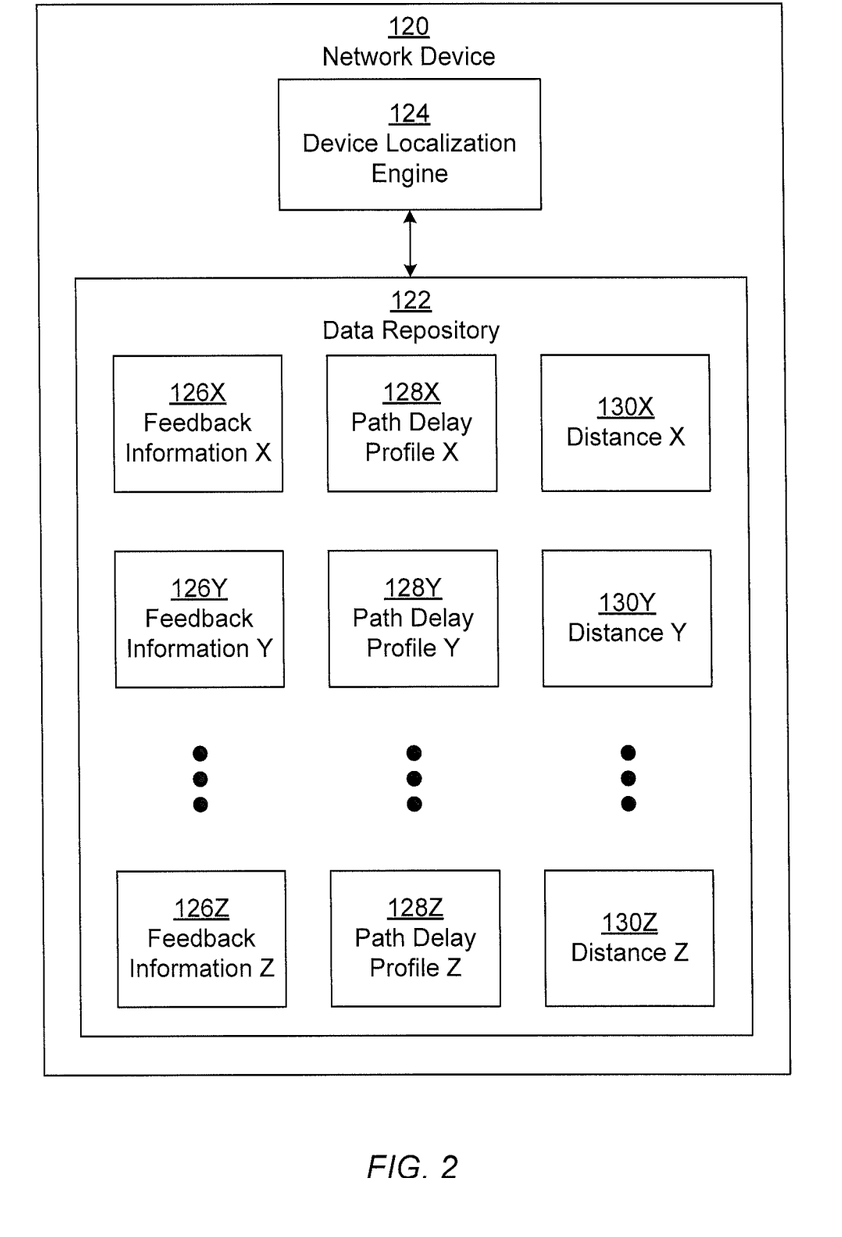

FIG. 2 shows a schematic diagram of a network device (120) in accordance with one or more embodiments. The network device (120) is any computing device that is directly or indirectly connected to the network. The network device (120) includes a data repository (122) and a device localization engine (124).

In one or more embodiments, the data repository (122) is any type of storage unit and/or device (e.g., a file system, database, collection of tables, or any other storage mechanism) for storing data. Further, the data repository (122) may include multiple different storage units and/or devices. The multiple different storage units and/or devices may or may not be of the same type or located at the same physical site. The data repository (122) includes functionality to store, temporarily, semi-permanently, or permanently, feedback information (e.g., feedback information X (126X), feedback information Y (126Y), feedback information Z (126Z)), power delay profile (e.g., power delay profile X (128X), power delay profile Y (128Y), power delay profile Z (128Z)), and distance (e.g., distance X (130X), distance Y (130Y), distance Z (130Z)) for each access point for which such information is received from the client device.

In one or more embodiments, feedback information (e.g., feedback information X (126X), feedback information Y (126Y), feedback information Z (126Z)) corresponds to information from the client device regarding the signal strength of the received signal of the various paths from an access point to the client device. In particular, when the access point sends wireless signals to the client device, the wireless signal may take any number of paths before being received by the client device. For example, a direct path may be the direct route from the transmitter of the access point to the receiver of the client device. The indirect path may be a route that bounces off walls and other objects. The feedback information (e.g., feedback information X (126X), feedback information Y (126Y), feedback information Z (126Z)) may be a collection of information from each of the paths of the signal that is received by the client device. The feedback information (e.g., feedback information X (126X), feedback information Y (126Y), feedback information Z (126Z)) may additionally include timing information detailing when each of the signals were received. For example, the timing information may be an absolute time or relative time. The relative time may be relative to a particular moment in time, such as when the first signal is received. In one or more embodiments, the feedback information (e.g., feedback information X (126X), feedback information Y (126Y), feedback information Z (126Z)) may correspond to channel state information.

The power delay profile (e.g., power delay profile X (128X), power delay profile Y (128Y), power delay profile Z (128Z)) is an intensity of the signal received as a function of time delay. In one or more embodiments, the time delay may be the difference in travel time between the various signals. The distance (e.g., distance X (130X), distance Y (130Y), distance Z (130Z)) corresponds to the computed distance between the access point and the client device.

In one or more embodiments, the device localization engine (124) includes functionality to perform the localization of the client device. For example, the device localization engine (124) may include functionality to compute the power delay profile, the distance, and/or the location of the client device.

While FIGS. 1 and 2 shows a configuration of components, other configurations may be used without departing from the scope of the claims. For example, various components may be combined to create a single component. As another example, the functionality performed by a single component may be performed by two or more components.

Figure 3:
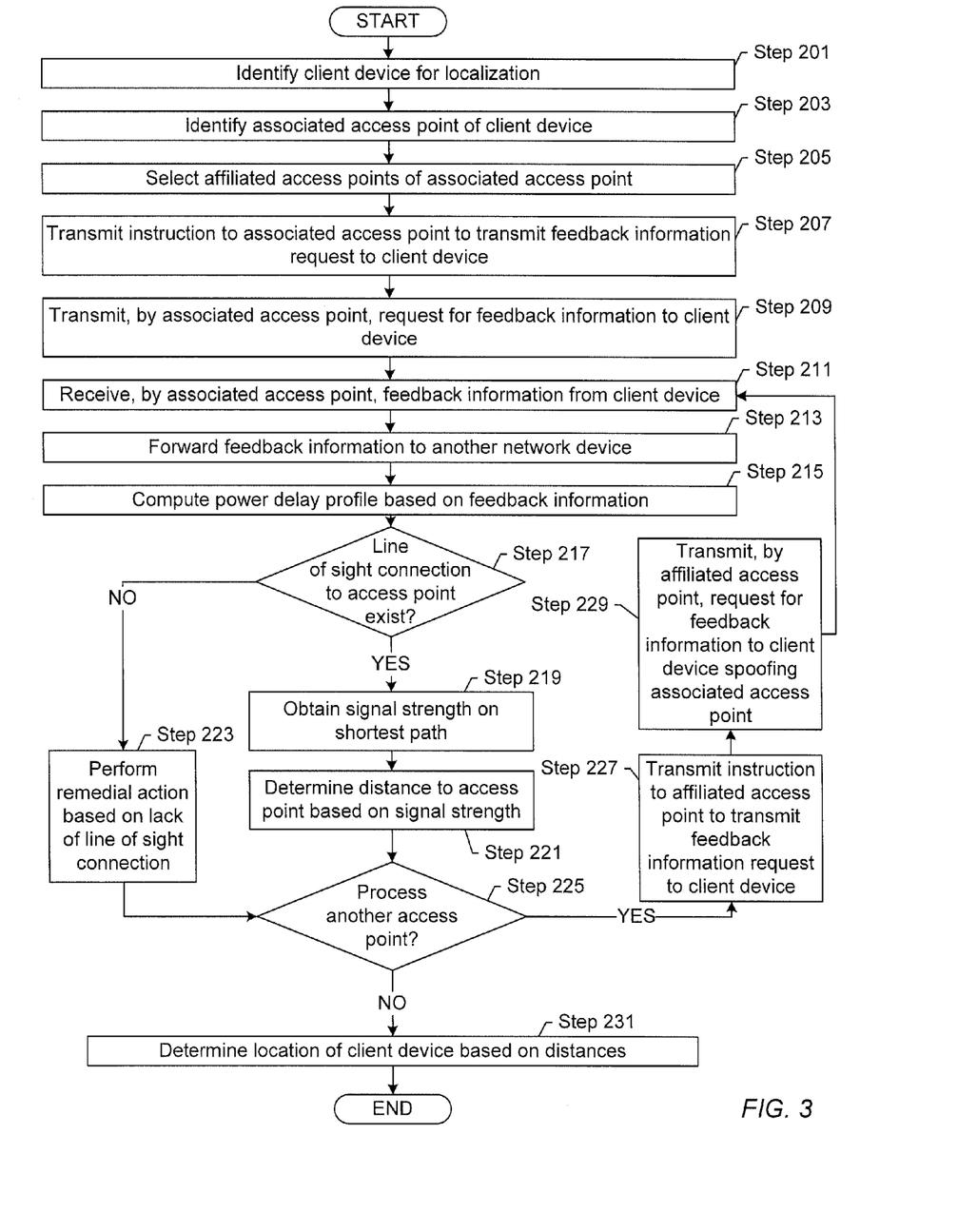
FIG. 3 shows a flowchart in accordance with one or more embodiments.

FIG. 3 shows a flowchart in accordance with one or more embodiments. While the various steps in this flowchart are presented and described sequentially, one of ordinary skill will appreciate that some or all of the steps may be executed in different orders, may be combined or omitted, and some or all of the steps may be executed in parallel. Furthermore, the steps may be performed actively or passively. For example, some steps may be performed using polling or be interrupt driven in accordance with one or more embodiments. By way of an example, determination steps may not require a processor to process an instruction unless an interrupt is received to signify that condition exists in accordance with one or more embodiments. As another example, determination steps may be performed by performing a test, such as checking a data value to test whether the value is consistent with the tested condition in accordance with one or more embodiments.

In Step 201, the client device for localization is identified in accordance with one or more embodiments. In one or more embodiments, the client device may be identified based on a property of the client device, a network rule, a request by a network administrator, or another trigger.

In Step 203, the access point that is associated to the client device is identified in accordance with one or more embodiments. Identifying the access point may include polling the client devices connected to each access point, polling each access point, obtaining the client device information from a data store, or performing another such step. In one or more embodiments, when a client device associates with an access point, a client device identifier is obtained from the client and stored. The client device identifier may be stored at the access point, at a controller, at the network device, at the coordinating device, or another device, or a combination thereof. Further, the client device identifier may be stored with the identifier of the associated access point.

In Step 205, one or more affiliated access points of the associated access point are selected in accordance with one or more embodiments. In one or more embodiments, affiliated access points are selected based on matching one or more criterion. For example, a criterion may be that the affiliated access point is in the same subset, in communication distance, within a threshold distance, closest to the associated access point, in the same area as the access point (e.g., same room, same floor, etc.), or other criterion.

In Step 207, an instruction is transmitted to the access point to transmit a feedback information request to the client device in accordance with one or more embodiments. In one or more embodiments, the coordinating device transmits an instruction to the associated access point to send the request for feedback information to the client device. If the coordinating device is the same as the associated access point, then Step 207 may be omitted.

Further, the transmission and forwarding of any communication as used herein may be performed using standard techniques for such type of transmission. Such techniques may include processing commands and instructions by various hardware and software components on each computing device, such as dividing a message including the instruction into packets, performing any encryption, transforming the packets into wireless signals, transmitting the wireless signals by a transmitter, such as an antenna, performing the reverse processing on the receiver side, and managing endpoint to endpoint communication. Alternatively or additionally, one or more proprietary techniques for communication may be used without departing from the scope.

In Step 209, the associated access point transmits request to the client device for the feedback information in accordance with one or more embodiments. In one or more embodiments, the associated access point transmits one or more wireless signals that include the request for feedback information. The one or more wireless signals may correspond to a sounding frame in accordance with one or more embodiments. The client device processes the one or more wireless signals in order to generate feedback information. If the feedback information is channel state information, then the client device may not need to be modified in order to perform embodiments.

In Step 211, the associated access point receives feedback information from the client device in accordance with one or more embodiments. Specifically, the client device responds to the associated access point to the request for feedback information.

In Step 213, the feedback information may be forwarded to another network device in accordance with one or more embodiments. In particular, if the associated access point is not the network device that processes the feedback information, the associated access point may forward the feedback information to the network device. If the associated access point is the network device that processes the feedback information, then Step 213 may be omitted.

In Step 215, the power delay profile is computed based on the feedback information in accordance with one or more embodiments. In other words, for each delay of a signal received, the network device may compute the signal strength of the received signal based on the feedback information.

In Step 217, a determination is made whether a line of sight connection to the access point exists in accordance with one or more embodiments. A line of sight connection to the access point means that the path from the transmitter on the access point to the receiver on the client device is unobstructed. In other words, the direct path from the transmitter on the access point to the receiver on the client device is not blocked by walls, objects, or other environmental obstructions that affect the signal strength. In one or more embodiments, determining whether a line of sight connection exists may be based on the shape of the power delay profile. In other words, if the shortest delay does not have the highest signal strength, then the line of sight connection may be determined not to exist. In other words, the signal strength may be lost on the path with the shortest delay by passing through one or more environmental obstructions while a longer path that may reflect off of one or more objects does not have environmental obstructions.

If a line of sight connection to the access point is determined to exist, in Step 219, the network device may obtain signal strength on the shortest path in accordance with one or more embodiments. In one or more embodiments, the signal strength on the shortest path is the signal strength of the path having the shortest delay. The signal strength on the path having the shortest delay may be obtained from the power delay profile. Specifically, from the power delay profile, the shortest delay is identified, and the signal strength matching the shortest delay is determined.

In Step 221, the distance to the access point based on the signal strength is determined in accordance with one or more embodiments. Determining the distance to the access point may be performed based on the change in signal strength between the transmitted signal and received signal. To determine the signal strength of the transmitted signal, the network device may have information identifying the signal strength of the transmitted signal based on a priori knowledge, communication with the access point that transmitted the one or more wireless signals, or other source. Based on the signal strength of the transmitted signal and the signal strength of the received signal obtained in Step 219, the network device may compute the signal loss that occurred by the transmission. The amount of signal loss is functionally related to the distance of the path. Thus, by computing the function based on the signal loss, the distance may be determined in accordance with one or more embodiments.

In a path-loss based approach, computing the distance may be performed by fitting the measured path-loss or loss of signal of a path as a function of a path-loss exponent. In a model driven approach, the measured data may be fit into one or more pre-determined models, which are different for different radio frequency environments, and the distance computed from the models.

If connection to the access point is determined to be lacking line of sight, then in Step 223, a remedial action is performed based on the lack of line of sight connection. For example, the remedial action may be to wait a predefined time period and then repeat the same access point transmitting the feedback information request to obtain new feedback information, use a different access point to obtain new feedback information, estimate the signal strength and distance, perform another remedial action or a combination of thereof. Another remedial action may be to use a previous power delay profile or CSI information, depending on whether the measurement is obtained within a threshold time period, that has the line of sight measurement.

In Step 225, a determination is made whether to process another access point in accordance with one or more embodiments. In other words, a determination is made whether to obtain feedback information and determine a distance for another access point.

If a determination is made to process another access point, than an instruction is transmitted to an affiliated access point to transmit a request for feedback information to the client device in Step 227. Transmitting the instruction may be performed in a same or similar manner as described above with reference to Step 207.

In Step 229, the affiliated access point transmits a request for feedback information to the client device spoofing the associated access point. Transmitting the instruction may be performed in a same or similar manner as described above with reference to Step 209 with the following change. Rather than the affiliated access point identifying the affiliated access point as the sender of the request, the affiliated access point incorrectly identifies the associated access point as the sender of the request.

Thus, the client device does not ignore the request for feedback information. Rather, the client device processes the one or more wireless signals that include the request from the affiliated access point to obtain feedback information describing the various paths between the affiliated access point and the client device. However, because the request for feedback information from the affiliated access point incorrectly identified the associated access point, the client device responds to the associated access point.

When the associated access point receives the feedback information, the associated device may process the feedback information as the network device or forward the feedback information to the network device for forwarding. Because of the coordination, the network device is capable of determining which access point sent the request that resulted in the feedback information. Thus, the network device may relate the distance with the access point and the client device identifier.

Returning to Step 225 of FIG. 3, if the determination is made not to process another access point, then the location of the client device may be determined based on the distances. In particular, the distances, which are each related to an access point, and the location of the respective access points may be used to determine the location of the client device. In one or more embodiments, triangulation may be performed to determine the location.

The location may be stored and/or reported. For example, the location may be used for administrative purposes (e.g., determine whether the client device is in an approved area, perform physical maintenance on the client device, perform another operation based on the location of the client device, or perform a combination of operations)

Although FIG. 3 shows the transmission of the instruction to each access point in sequential order starting with the associated access point in Step 209, the transmission may be in any order. For example, the instruction may be transmitted to one or more affiliated access points and then transmitted to the associated access point. Alternatively, the coordination may be performed using other techniques. For example, the instruction may include an absolute or relative time in which each access point is to transmit the request for feedback information. In such as scenario, the instruction to each access point may be transmitted at any time within a predefined time frame. By way of another example, the feedback information may include a tag identifier that directly or indirectly identifies which access point transmitted the request. Other techniques may be used to coordinate the request for feedback information without departing from the scope of the claims.

Further, although FIG. 3 shows the instruction being transmitted to the associated access point and the associated access point as sending the request for feedback information, Steps 207 and 209 may be omitted. In such a scenario, only one or more affiliated access points may transmit the request for feedback information. Further, in some embodiments, the affiliated access points may both transmit the request for feedback information and receive the feedback information, indirectly or directly, from the client device.

Figure 4:
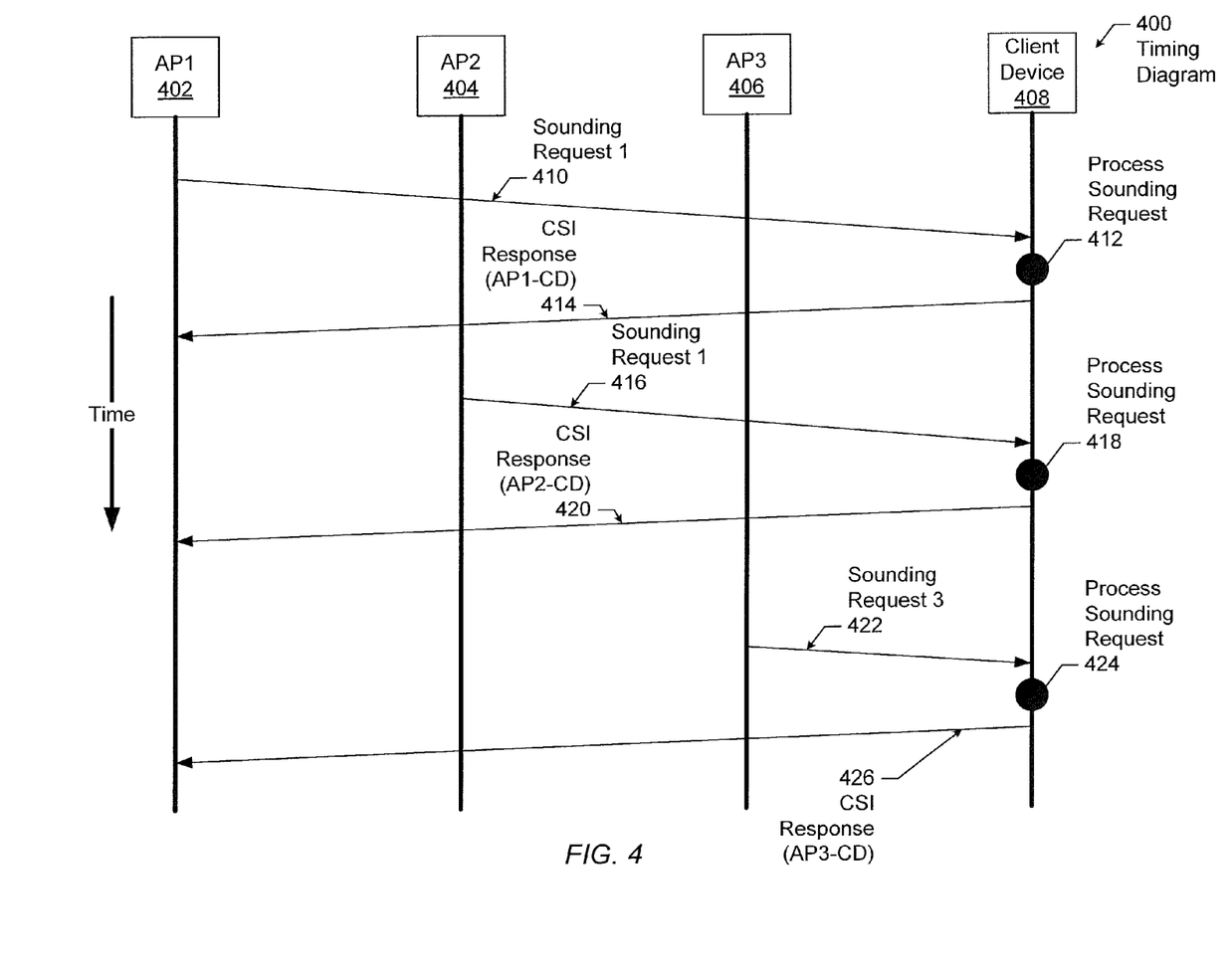

FIG. 4 shows an example in accordance with one or more embodiments. The following example is for explanatory purposes only and not intended to limit the scope of the claims. Further, for example purposes only, the request for feedback information is a sounding request and the feedback information is channel state information.

FIG. 4 shows an example timing diagram (400). In the timing diagram, for the purposes of the example, events that may occur later in time are below events that may occur earlier in time. As shown in the example, AP1 (402) is an associated access point for the client device (408). AP2 (404) and AP3 (406) are both affiliated access points for the client device (408). The associated access point will send the original sounding request, while the affiliated access points will mimic a sounding request as if coming from the associated access point. In the example, API (402) sends sounding request 1 (410) to the client device (408). The client device (408) processes the sounding request (412) responds with CSI response for the multi-paths from API to client device (CD) (414). AP2 (404) sends sounding request 2 (416), which is a 802.11 sounding frame with the source address and the BSS set based on the associated API (402), to the client device (408). The client device (408) processes the sounding request (418) responds to API (402) with CSI response for the multi-paths from AP2 to client device (CD) (420). AP3 (406) sends sounding request 3 (422), which is a 802.11 sounding frame with the source address and the BSS set based on the associated API (402), to the client device (408). The client device (408) processes the sounding request (424) and responds to API (402) with CSI response for the multi-paths from AP3 to client device (CD) (426). The pre-fabricated 802.11 sounding frames are the spoofed sounding frames which trick the client into believing the sounding frames are still coming from the associated AP1 while instead the sounding frames are instead being used to measure the channel from the affiliated APs to the client without having the client associate with the affiliated APs.

Figure 5:
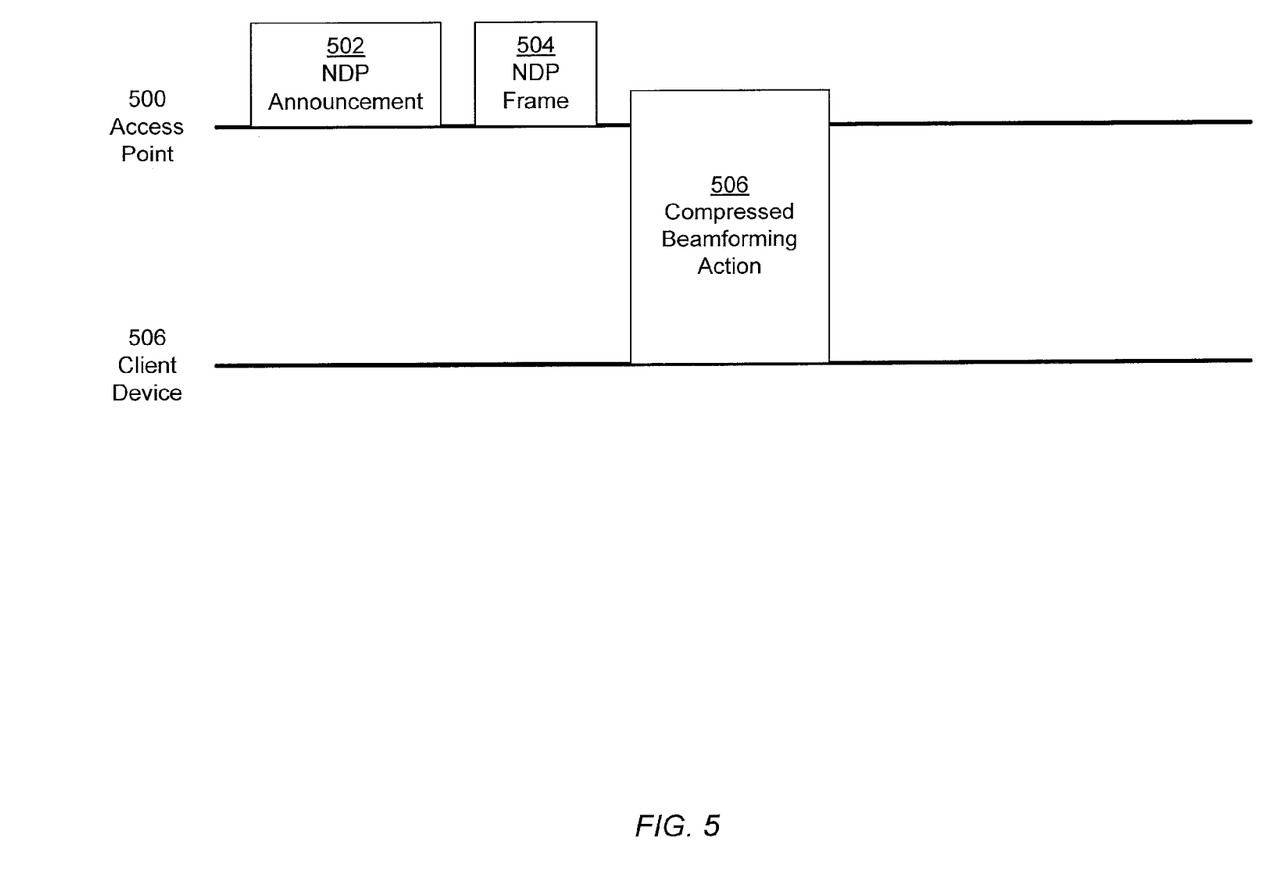

FIG. 5 shows an example of a sounding process in accordance with one or more embodiments. The following example is for explanatory purposes only and not intended to limit the scope. In the sounding process, an access point (500) sends a null data packet (NDP) announcement frame (502) followed by an NDP frame (504). In response, the client device (506) sends the feedback which is the compressed beamforming action frame (508). The beamforming action frame (506) includes the channel state information (CSI) which is used to determine the power-delay profile of the client device (506) with respect to the access point (500).

The following is for example purposes only and not intended to limit the scope. In one or more embodiments, the spoofing and sounding process may be controlled by the coordinator device. The coordinator device determines the last known sequence number used for the traffic identifier (TID) for transmitting the NDP frame from the associated access point. As part of the process of reading the last known sequence number, TID may be requested to be paused, such that no more frames will be sent from the TID. Further, a different TID for NDP frames may be used from the regular data frames so that regular data is not stopped when we are trying to do this distributed sounding. Once the TID for the NDP frames is paused on the associated device, coordinator device may send a request to an affiliated device with a pre-formed NDP frame, which has the source media access control (MAC) address and the sequence number incremented from the last known sequence number of the NDP TID used on the associated device. Once the request is sent, the affiliated device sends the spoofed NDP frame to the client device. The client may respond with the compressed feedback frame to the associated device. Once the complete sounding process is done for the access points, the NDP TIDs that are paused may be resumed for the access points.

Figure 61:
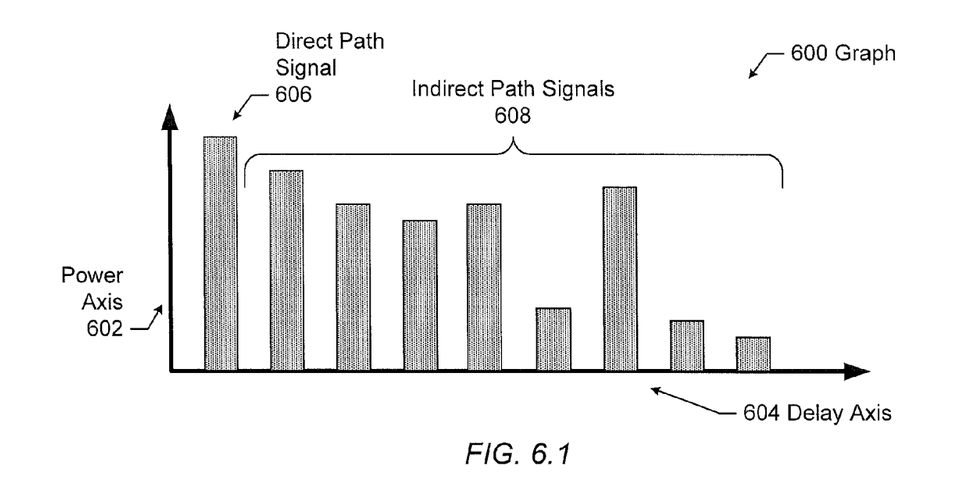

FIG. 6.1 shows an example graph (600) of the power delay profile when a line of sight path exists from the client to the access point. FIG. 6.1 is for explanatory purposes only and not intended to limit the scope of the claims. In the example graph, the power axis (602) provides the amount of the power and the delay axis (604) provides the amount of delay for various signals. The shortest path has the smallest delay and is the direct path. As shown in the example FIG. 6.1, the signal of the direct path or direct path signal (606) has the greater power than any of the indirect path signals (608) when a line of sight connection exists. In other words, the shortest path is not through any environmental obstructions in the line of sight connection and, thus, the power of the signal is the greatest.

Figure 62:
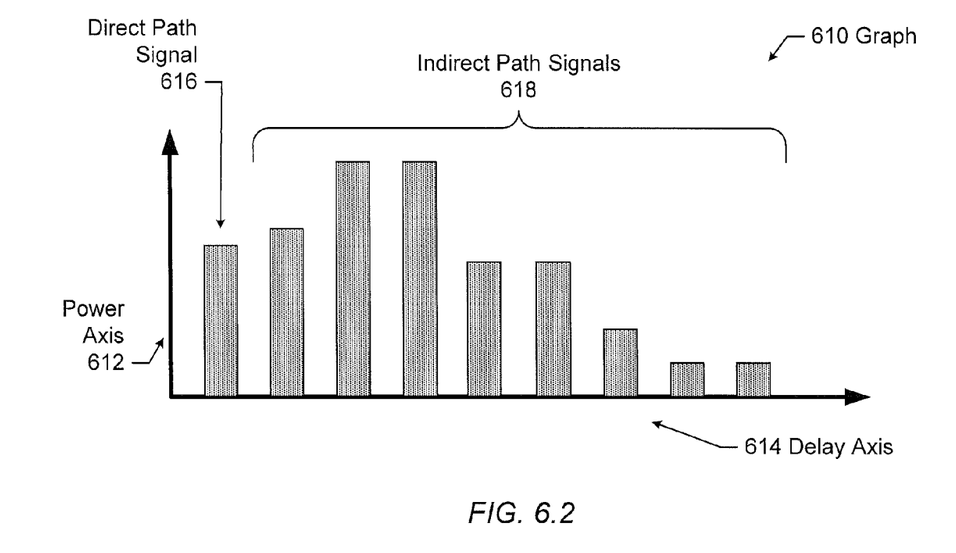

FIG. 6.2 shows an example graph (610) of the power delay profile when no line of sight path exists from the client to the access point. FIG. 6.2 is for explanatory purposes only and not intended to limit the scope of the claims. In the example graph of 6.2, the power axis (612) provides the amount of the power and the delay axis (614) provides the amount of delay for various signals. As discussed in FIG. 6.1, the shortest path has the smallest delay and is the direct path. As shown in the example FIG. 6.2, the direct path signal (616) may have less power than at least one other indirect path signal (618) when no line of sight connection exists. In other words, the shortest path is through an environmental obstructions. Thus, the power of the signal of the direct path may be less than an indirect path that does not have the environmental obstruction.

Figure 7:
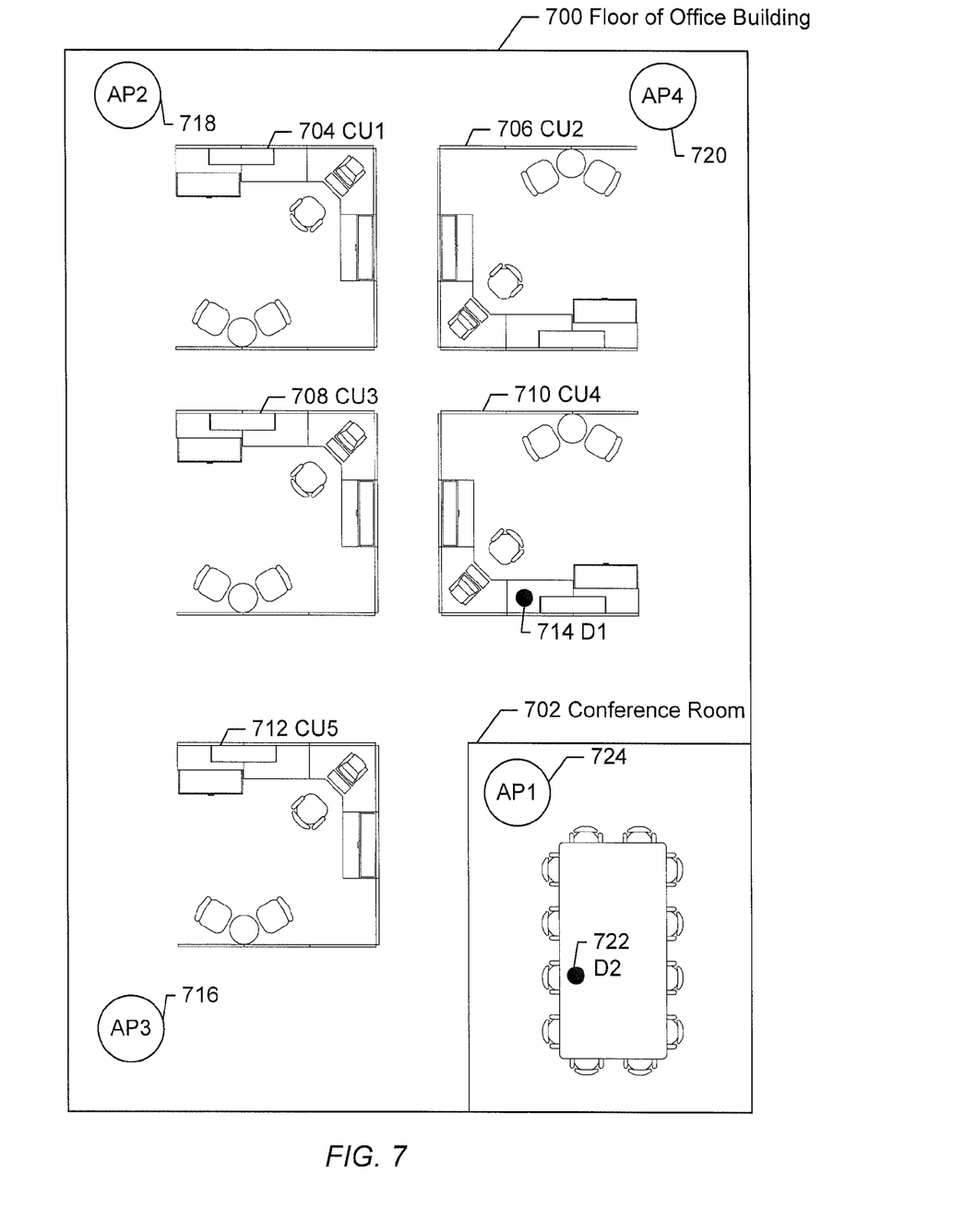

FIG. 7 shows an example in accordance with one or more embodiments. The following example is for explanatory purposes only and not intended to limit the scope of the claims. Further, for example purposes only, the request for feedback information is a sounding request and the feedback information is channel state information. For the following example, consider the scenario in which a floor of an office building (700) has a conference room (702) and five cubicles (e.g., CU1 (704), CU2 (706), CU3 (708), CU4 (710), CU5 (712)). In the example, a network administrator has identified unauthorized client device 1 (D1) (714). Although the network administrator may easily remove D1 (714) from the network, the network administrator would also like to inform the employee that such a client device is not allowed on the network. Thus, the network administrator wants to know the physical location of D1 (714).

To determine the physical location of D1 (714), the network administrator first determines that D1 (714) is associated with AP3 (716). Based on criteria that the selected affiliated APs be nearby and in the same room as the associated AP (i.e., AP3 (716)), affiliated access point AP2 (718) and affiliated access point AP4 (720) are selected. Coordination is performed, such that each access point sends sounding requests in a particular order. Continuing with the example, AP3 (716) sends a sounding request to D1 (714), to which D1 (714) responds with channel state information describing the paths from AP3 (716) to D1 (714). D1 (714) responds to AP3 (716) because D1 (714) is associated with AP3 (716). Affiliated access points AP2 (718) and AP4 (720) also send sounding requests to D1 (714). However, in order to ensure that such sounding requests are not ignored, affiliated access points AP2 (718) and AP4 (720) incorrectly identify AP3 (716) as the sender of the sounding requests. Because D1 (714) incorrectly determines that AP3 (716) is the sender of the sounding requests, D1 (714) processes the sounding requests to obtain channel state information for the paths from AP2 (718) to D1 (714) and AP4 (720) to D1 (714), respectively. D1 (714) sends the response channel state information to AP3 (716) because AP3 is associated with D1 (714). AP3 (714) processes the channel state information to determine the location of D1. Specifically, using the various channel state information, AP3 (714) determines the distance between each access point and D1 (714). Based on the coordination, AP3 (714) relates the distances to the corresponding access point is able to determine the location of D1 (714) as being in CU4 (710). AP3 (714) reports the location of D1 (714) to the network administrator, who contacts the employee in CU4 (710) and informs the employee about the policy against associating client device D1 (714).

Continuing with the example, the network administrator also determines that client device D2 (722) should have some maintenance be performed. The network administrator guess that D2 (722) is located in the conference room (702) based on determining that D2 (722) is associated with AP1 (724) in the conference room (702). However, the conference room (702) includes several client devices (not shown) and, thus, the network administrator needs a more exact location of D2 (722). Based on a criterion that the affiliated access points are nearby, AP3 (716) and AP4 (720) are selected as the affiliated access points. Coordination is performed, such that each access point sends sounding requests in a particular order. Continuing with the example, AP1 (724) sends a sounding request to D2 (722), to which D2 (722) responds with channel state information describing the paths from AP1 (724) to D2 (722). D2 (722) responds to AP1 (724) because D1 (714) is associated with AP1 (724). Affiliated access points AP3 (716) and AP4 (720) also send sounding requests to D2 (722). However, in order to ensure that such sounding requests are not ignored, affiliated access points AP3 (716) and AP4 (720) incorrectly identify AP1 (724) as the sender of the sounding requests. In other words, the wireless signals incorrectly identify AP1 (724) as the sender of the sounding requests. Because D2 (722) incorrectly determines that AP1 (724) is the sender of the sounding requests, D2 (722) processes the sounding requests to obtain channel state information for the paths from AP3 (716) to D2 (722) and AP4 (720) to D2 (722), respectively. D2 (722) sends the response channel state information to AP1 (724) because AP1 (724) is associated with D2 (722).

AP1 (724) processes the channel state information and determines that a line of sight does not exist between AP4 (720) and D2 (722) and between AP3 (716) and D2 (722). Because D2 (722) is suspected as being in conference room (702), AP1 (724) uses a function that accounts for the thickness of the walls of the conference room (702) to estimate the signal strength on the shortest path from AP4 (720) to D2 (722) and from AP3 (716) to D2 (722), respectively, using the respective received channel state information. Then, AP1 (724) determines the respective distances, and uses the respective distances to determine the corresponding location of D2 (722) within the conference room. AP1 (724) reports the location of D2 (722) to the network administrator, who uses the location to perform the maintenance on D2 (722).

As shown by way of an example, one or more embodiments perform localization of a client device using requests for feedback information from access points that are not associated with the client device. In one or more embodiments, the client device does not need to be reconfigured or otherwise changed to process the requests.

Figure 8:
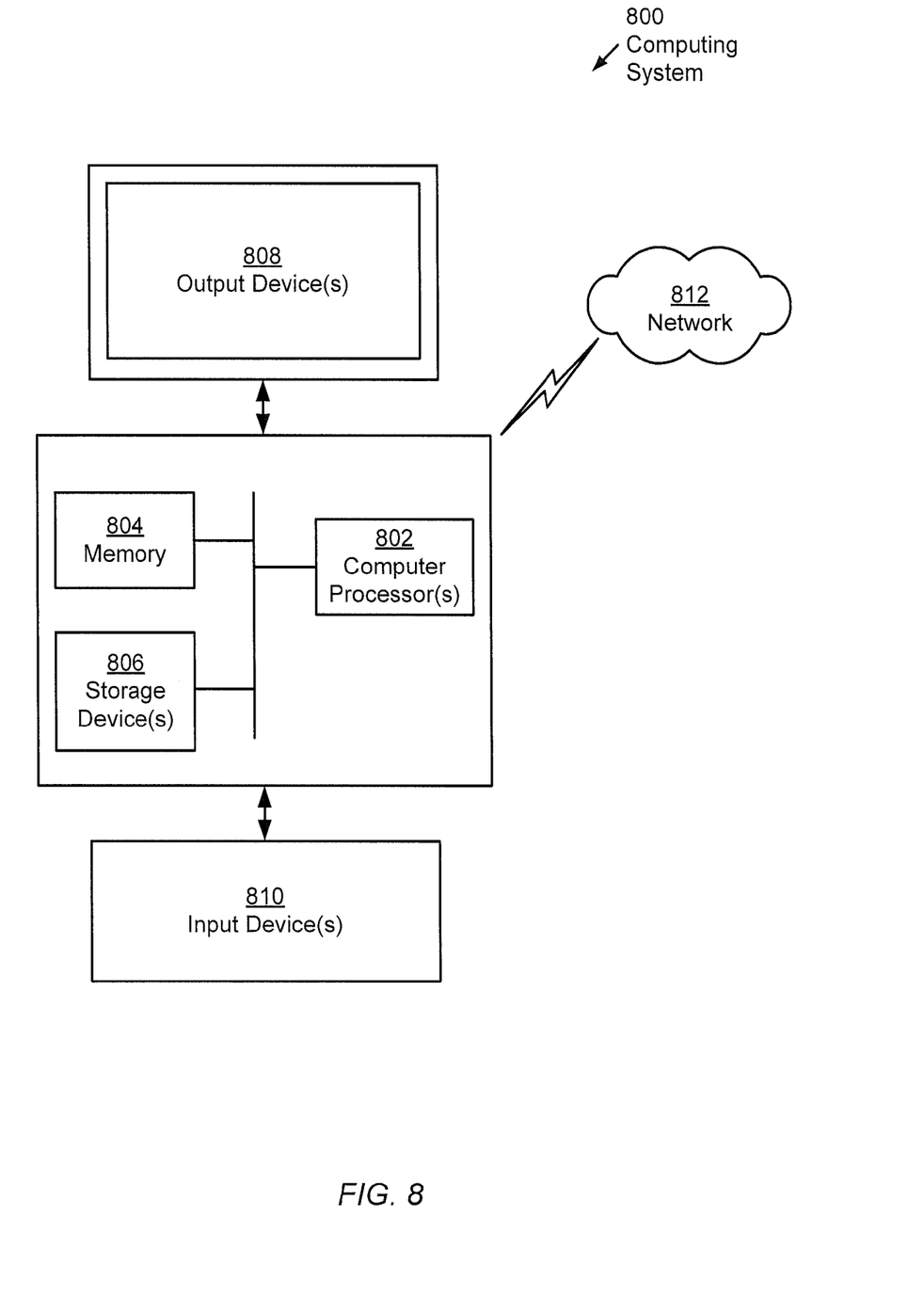
FIG. 8 shows a computing system in accordance with one or more embodiments.

Embodiments may be implemented on virtually any type of computing system regardless of the platform being used. For example, the computing system may be one or more mobile devices (e.g., laptop computer, smart phone, personal digital assistant, tablet computer, or other mobile device), desktop computers, servers, blades in a server chassis, or any other type of computing device or devices that includes at least the minimum processing power, memory, and input and output device(s) to perform one or more embodiments. For example, as shown in FIG. 8, the computing system (800) may include one or more computer processor(s) (802), associated memory (804) (e.g., random access memory (RAM), cache memory, flash memory, etc.), one or more storage device(s) (806) (e.g., a hard disk, an optical drive such as a compact disk (CD) drive or digital versatile disk (DVD) drive, a flash memory stick, etc.), and numerous other elements and functionalities. The computer processor (s) (802) may be an integrated circuit for processing instructions. For example, the computer processor(s) may be one or more cores, or micro-cores of a processor. The computing system (800) may also include one or more input device(s) (810), such as a touchscreen, keyboard, mouse, microphone, touchpad, electronic pen, or any other type of input device. Further, the computing system (800) may include one or more output device(s) (808), such as a screen (e.g., a liquid crystal display (LCD), a plasma display, touchscreen, cathode ray tube (CRT) monitor, projector, or other display device), a printer, external storage, or any other output device. One or more of the output device(s) may be the same or different from the input device(s). The computing system (800) may be connected to a network (812) (e.g., a local area network (LAN), a wide area network (WAN) such as the Internet, mobile network, or any other type of network) via a network interface connection (not shown). The input and output device(s) may be locally or remotely (e.g., via the network (812)) connected to the computer processor(s) (802), memory (804), and storage device(s) (806). Many different types of computing systems exist, and the aforementioned input and output device(s) may take other forms.

Software instructions in the form of computer readable program code to perform embodiments may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that when executed by a processor(s), is configured to perform embodiments.

Further, one or more elements of the aforementioned computing system (800) may be located at a remote location and connected to the other elements over a network (812). Further, embodiments may be implemented on a distributed system having a plurality of nodes, where each portion may be located on a different node within the distributed system. In one embodiment, the node corresponds to a distinct computing device. Alternatively, the node may correspond to a computer processor with associated physical memory. The node may alternatively correspond to a computer processor or micro-core of a computer processor with shared memory and/or resources.

While the invention has been described with respect to a limited number of embodiments, those skilled in the art, having benefit of this disclosure, will appreciate that other embodiments can be devised which do not depart from the scope as disclosed herein. Accordingly, the scope of the claims should be limited only by the attached claims.

What is claimed is:

1. A computer-implemented method, comprising:
   transmitting a request for feedback information corresponding to an access point and a client device associated with the access point, wherein feedback information includes information related to a communications path between a client device and an access point;
   receiving feedback information corresponding to the access point and the client device associated with the access point;
   receiving affiliated feedback information corresponding an affiliated access point and the client device, wherein:
      the affiliated feedback information is facilitated by a request for affiliated feedback information;
      the affiliated feedback information includes information incorrectly identifying the access point as a sender of the request for affiliated feedback information; and
      the client device is to only respond to request for the affiliated feedback information; and
   determining, by a processor, a location of a network device using the feedback information and the affiliated feedback information.

2. The method of claim 1, further comprising:
   transmitting a communication including the feedback information and the affiliated feedback information; and
   receiving a response to the communication including the location of the network device.

3. The method of claim 1, wherein the feedback information includes a tag identifier that directly or indirectly identifies a sender of a request for the feedback information.

4. The method of claim 1, wherein the request for feedback information includes one or more sounding frames.

5. The method of claim 1, further comprising:
   determining a distance between the client device and the access point using the feedback information;
   determining a distance between the client device and the affiliated access point using the affiliated feedback information; and
   determining a location of the network device using the distance between the client device and the access point and the distance between the client device and the affiliated access point.

6. The method of claim 5, wherein determining a distance between the client device and an access point includes determining a Power Delay Profile (PDP) based on the feedback information.

7. The method of claim 5, wherein transmitting a request for feedback information includes transmitting a wireless signal using a transmit power, and wherein determining a distance between the client device and the access point includes using a path loss, wherein the path loss is determined by comparing the transmit power to a signal strength of the feedback information when the feedback information is received.

8. The method of claim 1, further comprising:
   determining a path loss of a path of the received feedback information, wherein the path loss is determined using a time difference between a time that the feedback information was received and a time that data was received on a second path.

9. The method of claim 1, further comprising:
   determining whether the communications path is a direct path or an indirect path, wherein a direct path includes a line of sight connection.

10. The method of claim 1, further comprising:
    determining that the communications path is an indirect path, wherein an indirect path includes an obstruction between end points of the communications path;
    waiting a predetermined period of time;
    re-transmitting the request for feedback information corresponding to an access point and a client device associated with the access point on a second communications path; and
    determining that the second communications path is a direct path.

11. The method of claim 1, wherein the information incorrectly identifying the access point as a sender of the request for affiliated feedback information is included in the request for affiliated feedback information by the affiliated access point to spoof the access point.

12. A computing device, comprising:
    one or more processors; and
    a memory having instructions stored thereon, which when executed by the one or more processors, cause the one or more processors to:
       transmit a request for feedback information corresponding to an access point and a client device associated with the access point, wherein feedback information includes information related to a communications path between a client device and an access point;
       receive feedback information corresponding to the access point and the client device associated with the access point;

receive affiliated feedback information corresponding an affiliated access point and the client device, wherein:

the affiliated feedback information is facilitated by a request for affiliated feedback information;

the affiliated feedback information includes information incorrectly identifying the access point as a sender of the request for affiliated feedback information; and the client device to only respond to request for the affiliated feedback information; and determine a location of the network device using the feedback information and the affiliated feedback information.

13. The computing device of claim 12, wherein the instructions are further to cause the one or more processors to:

transmit a communication including the feedback information and the affiliated feedback information; and receive a response to the communication including the location of the network device.

14. The computing device of claim 12, wherein the feedback information includes a tag identifier that directly or indirectly identifies a sender of a request for the feedback information.

15. The computing device of claim 12, wherein the request for feedback information includes one or more sounding frames.

16. The computing device of claim 12, wherein the instructions are further to cause the one or more processors to:

determine a distance between the client device and the access point using the feedback information;

determine a distance between the client device and the affiliated access point using the affiliated feedback information; and determine a location of the network device using the distance between the client device and the access point and the distance between the client device and the affiliated access point.

17. The computing device of claim 16, wherein to determine a distance between the client device and an access point, the instructions are further to cause the one or more processors to determine a Power Delay Profile (PDP) based on the feedback information.

18. A non-transitory machine-readable storage medium including instructions that when executed by a data processing apparatus to cause the data processing apparatus to:

receive wireless signals associated with one or more wireless devices using a wireless receiver;

transmit wireless signals addressed to one or more wireless devices using a wireless transmitter;

transmit a request for feedback information corresponding to an access point and a client device associated with the access point, wherein the feedback information includes information related to a communications path between a client device and an access point;

receive the feedback information corresponding to the access point and the client device associated with the access point;

receive affiliated feedback information corresponding to an affiliated access point and the client device, wherein:

the affiliated feedback information is facilitated by a request for affiliated feedback information the affiliated feedback information includes information incorrectly identifying the access point as a sender of the request for affiliated feedback information; and the client device is to only respond to request for the affiliated feedback information; and determine a location of the network device using the feedback information and the affiliated feedback information.

\* \* \* \* \*